(12) United States Patent
Choksi

(10) Patent No.: US 7,103,025 B1
(45) Date of Patent: Sep. 5, 2006

(54) METHOD AND SYSTEM FOR EFFICIENT UTILIZATION OF TRANSMISSION RESOURCES IN A WIRELESS NETWORK

(75) Inventor: Ojas T Choksi, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 1141 days.

(21) Appl. No.: 09/839,943

(22) Filed: Apr. 19, 2001

(51) Int. Cl.
*H04B 7/216* (2006.01)
*H04J 3/16* (2006.01)
*H04J 3/22* (2006.01)
*H04J 3/24* (2006.01)
*H04J 3/18* (2006.01)

(52) U.S. Cl. .................. 370/335; 370/465; 370/474; 370/477

(58) Field of Classification Search .............. 370/216, 370/345, 347, 350, 389, 392, 395, 465, 469, 370/471, 474, 476
See application file for complete search history.

(56) References Cited

U.S. PATENT DOCUMENTS

| | | | | |
|---|---|---|---|---|
| 6,088,342 | A * | 7/2000 | Cheng et al. | 370/320 |
| 6,330,435 | B1 * | 12/2001 | Lazraq et al. | 455/412.1 |
| 6,519,223 | B1 * | 2/2003 | Wager et al. | 370/216 |
| 6,532,211 | B1 * | 3/2003 | Rathonyi et al. | 370/230 |
| 6,628,641 | B1 * | 9/2003 | Strawczynski et al. | 370/349 |

OTHER PUBLICATIONS

"Information technology—Telecommunications and information exchange between systems—Local and metropolitan area networks—Specific requirements—Part 11: Wireless LAN Medium Access Control (MAC) and Physical Layer (PHY) specifications," Reference No. ISO/IEC 8802-11:1999(E), ANSI/IEEE Std. 802.11, 1999 Edition., cover sheet, pp. 34-97.

"Data Service Options for Spread Spectrum Systems: Radio Link Protocol Type 3," TR 45, TIA/EIA/IS-707-A-1.10 (PN-4541.10), Ballot Resolution Version, Dec. 1999, cover sheet, Contents i-iv; pp. 1-1 through 4-18.

Pending Patent Application: Choksi, Ojas T., *Method and System for Dynamically Controlling Frame Retransmissions in a Wireless Network*, U.S. Appl. No. 09/839,827, filed Apr. 19, 2001.

* cited by examiner

*Primary Examiner*—Huy D. Vu
*Assistant Examiner*—Daniel Ryman
(74) *Attorney, Agent, or Firm*—Baker Botts L.L.P.

(57) ABSTRACT

A method and system for efficient utilization of transmission resources in a wireless network includes requesting retransmission of an unsuccessfully received radio frame up to an allowed number of times. In response to at least unsuccessfully receiving the frame from the allowed number of retransmissions, a signal is generated for transmission to a device transmitting the frame. The signal is operable to prevent the device from transmitting a set of remaining frames for a packet to which the frame belongs.

19 Claims, 4 Drawing Sheets

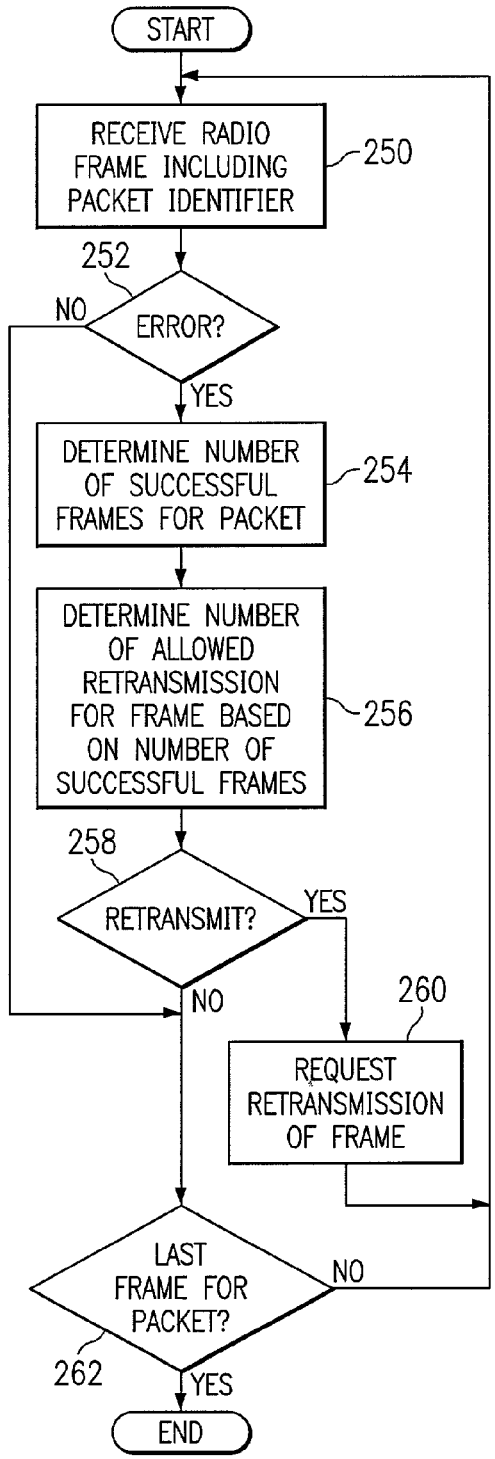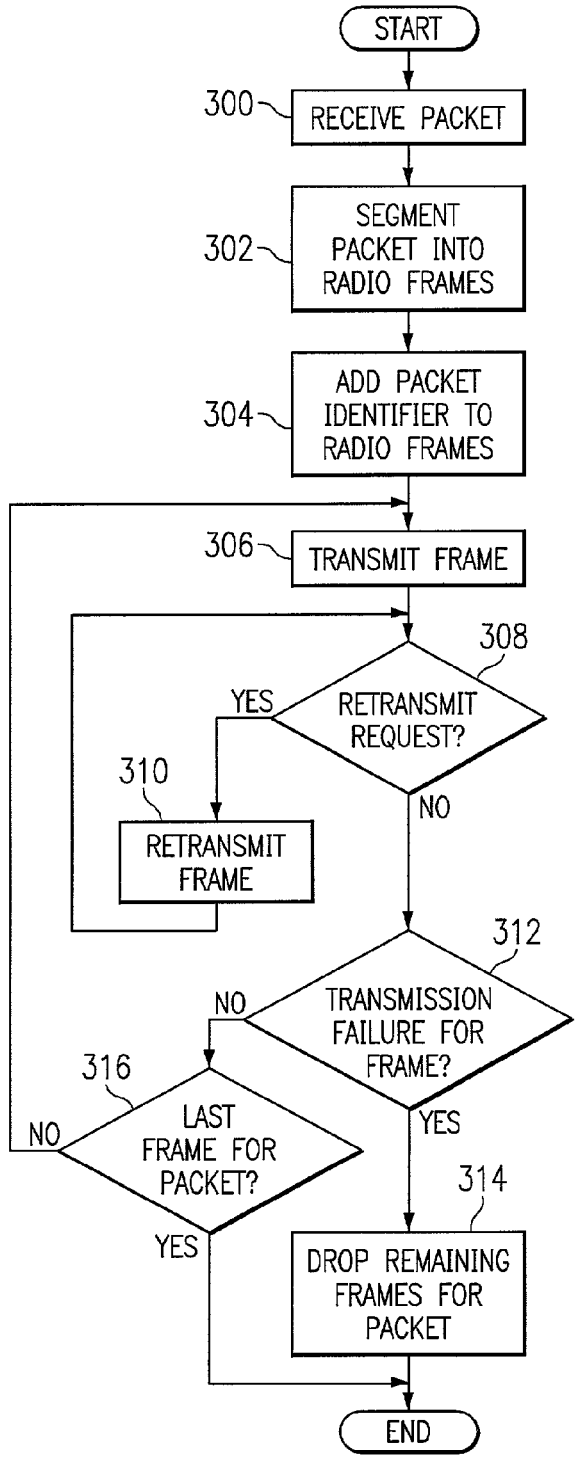
FIG. 5
FIG. 6

METHOD AND SYSTEM FOR EFFICIENT UTILIZATION OF TRANSMISSION RESOURCES IN A WIRELESS NETWORK

RELATED APPLICATION

This application is related to U.S. patent application Ser. No. 09/839,827 entitled "Method and System for Dynamically Controlling Frame Retransmissions in a Wireless Network" filed on Apr. 19, 2001.

TECHNICAL FIELD OF THE INVENTION

The present invention relates generally to the field of wireless communications, and more particularly to a method and system for efficient utilization of transmission resources in a wireless network.

BACKGROUND OF THE INVENTION

Traditional wireless networks include a number of base stations (BTS) and one or more mobile switching centers (MSC)/base station controllers (BSC). The BTSs each cover a geographic region, or cell of the wireless network and communicate with mobile telephones in the cell. The MSCs/BSCs provide switch and soft handoff functionality for the wireless network. To support data calls, wireless networks typically include a data interworking function (IWF). The IWF connects the wireless network to the Internet or other data network.

Each cell of a wireless network is able to support a certain number of wireless calls. This capacity is a function of frequency reuse, carrier to interference ratio, bit-energy to noise ratio, effective bit-rate protocol and other criteria of the wireless link. The wireless link may be based on established standards such as IS-54 (TDMA), IS-95 (CDMA), GMS and AMPS, 802.11 based WLAN, new upcoming standards such as CDMA 2000 and W-CDMA or proprietary radio protocols.

For CDMA and other radio-link protocols, Internet protocol (IP) and other packets are fragmented into a number of radio frames that are transmitted over the wireless link. In the event of transmission errors, a frame is retransmitted up to a set number of times. If the frame is not successfully received by such retransmissions, the radio-link protocol aborts delivery of the frame, continues with the succeeding frames and leaves it to packet layer protocols to recover the lost data.

SUMMARY OF THE INVENTION

The present invention provides a method and system for efficient utilization of transmission resources in a wireless network. In particular, the present invention prevents transmission over a wireless link of radio frames for a packet to be discarded by a receiving device due to previous transmission errors.

In accordance with one embodiment of the present invention, a method and system for efficient utilization of transmission resources in a wireless network includes requesting retransmission of an unsuccessfully received radio frame up to an allowed number of times. In response to at least unsuccessfully receiving the frame after the allowed number of retransmissions, a signal is generated for transmission to a device transmitting the frame. The signal is operable to prevent the device from transmitting a set of remaining frames for the packet. More specifically, in accordance with a particular embodiment of the present invention, the radio frames may each identify their corresponding packet. In this embodiment, the signal generated for transmission to the device transmitting the frame identifies the packet. The transmitting device drops the remaining frames of the identified packet in response to receipt of the signal. In another embodiment, the signal may be a bit map of frames received successfully and/or unsuccessfully.

Technical advantages of the present invention include providing a method and system for efficient utilization of transmission resources in a wireless network. In a particular embodiment, in the event a frame is lost by a receiving device due to transmission errors, all remaining frames belonging to the same packet are discarded by a transmitting device. This reduces unnecessary transmissions, and thus interference observed within the network.

Another technical advantage of one or more embodiments of the present invention includes providing an improved wireless communication device. In particular, the wireless communication device determines the effect of lower layer mistransmissions on upper layer data sets and eliminates transmission of lower layer data that will need to be retransmitted due to already existing errors in an upper layer data set. Accordingly, the wireless device provides increased efficiency in bandwidth usage, which allows for an increase in the services or level of service the device can support at a given bandwidth. It also allows efficient bandwidth usage for a data call, and thus cost of the call. Moreover, it improves the quality of service (QoS) of the higher layer transmission.

Still another technical advantage of one or more embodiments of the present invention includes providing an improved base station for communicating with mobile devices in a wireless network. In particular, the base station communicates with mobile devices to identify and drop prior to transmission over the network radio frames for packets that will need to be retransmitted due to previous transmission errors. Accordingly, transmission bandwidth of the base station is optimized to support additional revenue-generating connections or services.

Other technical advantages of the present invention will be readily apparent to one skilled in the art from the following figures, description and claims.

BRIEF DESCRIPTION OF THE DRAWINGS

For a more complete understanding of the present invention and its advantages, reference is now made to the following description taken in conjunction with the accompanying drawings, wherein like numerals represent like parts, and which:

FIG. 5 is a flow diagram illustrating a method for dynamically controlling frame retransmission over a wireless link in accordance with one embodiment of the present invention;

FIG. 6 is a flow diagram illustrating a method for transmitting radio frames of a packet over a wireless link in accordance with one embodiment of the present invention.

DETAILED DESCRIPTION OF THE INVENTION

Figure 1:
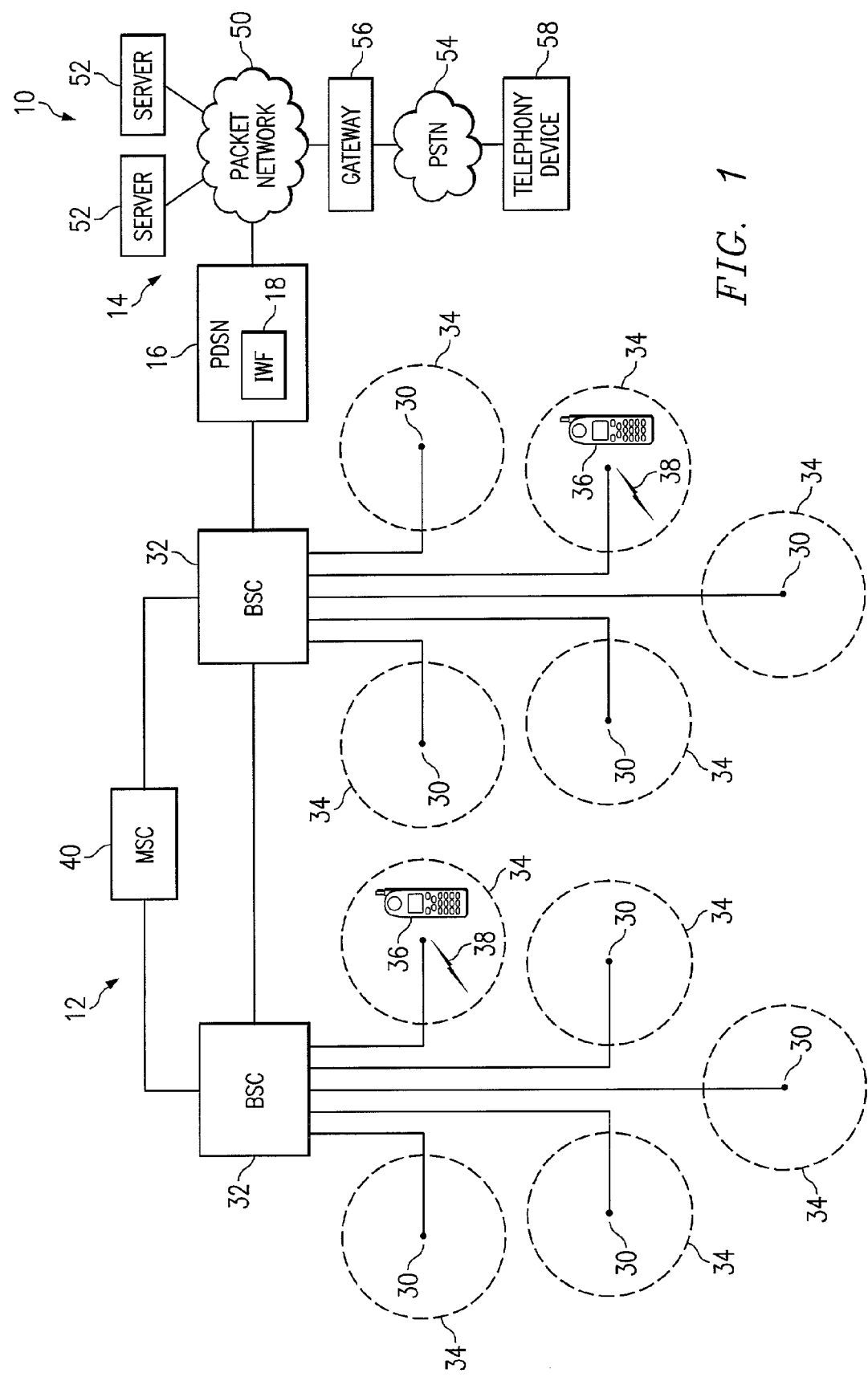
FIG. 1 is a block diagram illustrating a communications network in accordance with one embodiment of the present invention.

FIG. 1 illustrates a communications system 10 in accordance with one embodiment of the present invention. In this embodiment, the communications system 10 includes a cellular wireless network in which terrestrial wireless transmissions originate in geographically delimited cells. It will be understood that the present invention may be used in connection with other suitable wireless networks.

Referring to FIG. 1, the communications system 10 includes a wireless network 12 connected to a wireline network 14 through a packet data serving node (PDSN) 16. The PDSN 16 comprises a router that directs traffic between the wireless and wireline networks 12 and 14. In one embodiment, the PDSN 16 includes a data interworking function (IWF) 18 that provides connectivity between the wireless and wireline networks 12 and 14 via circuit switched and packet switched wireless data protocols. It will be understood that connectivity between the wireline and wireless networks 12 and 14 may be otherwise suitably provided without departing from the scope of the present invention.

The wireless network 12 includes a number of base stations (BTSs) 30 connected to base station controllers (BSCs) 32. The BTSs 30 each cover a geographic region, or cell 34 of the wireless network 12 and communicate with mobile devices 36 in the cell 34. The mobile devices 36 may be cell phones, data phones, portable data devices, portable computers, handheld devices, handsets, portable network appliances or other suitable devices capable of communicating information over a wireless link 38.

The BSCs 32 are connected to each other, to the PDSN 16 and to a mobile switching center (MSC) 40. The BSCs 32 and the MSC 40 provide switch and soft handoff functionality for the wireless network 12. In this way, voice, video, data and other information is routed to and from the mobile devices 36 and connections are maintained with the mobile devices 36 as they move throughout the wireless network 12.

Wireless link 38 is a radio frequency (RF) link. The wireless link 38 may be based on established technologies or standards such as IS-54 (TDMA), IS-95 (CDMA), GSM and AMPS, 802.11 based WLAN, or more recent technology such as CDMA 2000 and W-CDMA or proprietary radio interfaces. In a particular embodiment, wireless link 38 comprises a code division multiple access (CDMA) link based on a CDMA standard and in which, as described in more detail below, packets are segmented into radio frames for transmission over the wireless interface and reassembled by the receiving device to reconstitute the packets.

The wireline network 14 includes a packet network 50 connecting a number of servers 52 to each other and to the PDSN 16. The packet network 50 also connects the PDSN 16, and thus the wireless network 12 to the public switched telephone network (PSTN) 54 through gateway 56. Accordingly, mobile devices 36 may communicate through wireless network 12, packet network 50 and PSTN 54 with standard telephones, clients and computers using modems or digital subscriber line (DSL) connections or other telephony devices 58.

The data network 50 may be the Internet, intranet, extranet, or other suitable local or wide area network capable of communicating information between remote endpoints. For the Internet embodiment, information is transmitted in Internet protocol (IP) packets using transport control protocol/Internet protocol (TCP/IP). It will be understood that information may be transmitted in other suitable packets, including asynchronous transport mode (ATM) and other cells or datagrams.

The servers 52 may comprise voicemail servers (VMS), fax/modem servers, short message center (SMSC) servers, conferencing facilities, authentication, authorization, and accounting (AAA) servers, billing servers, home location registers (HLR), home subscriber servers (HSS), domain name servers (DNS) and other suitable servers and functionality providing services to mobile devices 36 and/or to wireless and/or wireline connections in the communications system 10.

Figure 2:
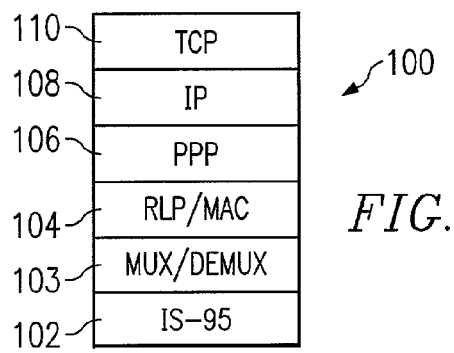
FIG. 2 is a block diagram illustrating a protocol stack for communication over the wireless link of FIG. 1 in accordance with one embodiment of the present invention.

FIG. 2 illustrates a protocol stack 100 for communication over the wireless link 38 in accordance with one embodiment of the present invention. In this embodiment, the wireless link 38 comprises a CDMA link. It will be understood that the present invention may be used in connection with other suitable wireless links in which the packets are segmented into a set of radio frames for transmission over the wireless link 38 and reassembled at a receiving device to reconstitute the packet.

Referring to FIG. 2, the protocol stack 100 includes an IS-95/CDMA 2000 layer 102, radio link protocol (RLP) layer 104, point-to-point protocol (PPP) layer 106, IP layer 108 and TCP layer 110. In this embodiment, the IS-95 layer 102 comprises a lower layer that communicates over the physical interface while the remaining layers form progressively higher layers with the TCP layer 110 communicating with applications at the transmitting and receiving devices running the stack 100.

The TCP layer 110 handles each connection independently and maintains end-to-end flow control. The TCP layer 110 employs retransmission and window size control on each connection making them reliable even when the underlying systems experience congestion or temporary failures. The TCP layer 110 relies on packet loss as an indication of congestion. Upon experiencing packet losses, the TCP sender retransmits the lost packets and lowers its window size to reduce the amount of data being sent out at a time.

The PPP layer 106 establishes a point-to-point link between the mobile device 36 and the PDSN 16 or other suitable server. The RLP layer 104 monitors and controls the radio link. Upon experiencing frame losses, the RLP sender retransmits the lost frames to allow recovery of frames lost to transmission errors. The IS-95 layer 102 comprises a specific radio frequency protocol and communicates with the physical interface.

In operation, application data is received at the TCP layer 110 of the sender and segmented into packets for transmission over the wireless link 38. The segmented data is passed to the IP layer 108, from the IP layer 108 to the PPP layer 106 and from the PPP layer 106 to the RLP layer 104. The RLP layer 104 generates a set of radio frames comprising the segmented data of each packet. As used herein, the term each mean every one of at least a subset of the identified items. The radio frames are passed to the MUX/DEMUX layer for multiplexing bearer and control traffic. The multiplexed data is then passed to the IS-95/CDMA 2000 layer 102 for transmission over the wireless link 38. The RLP sender retransmits lost radio frames as requested by the RLP receiver. The TCP sender similarly retransmits lost packets as requested by the TCP receiver.

At the receiving device, the radio frames are received by the physical layer and passed to the RLP layer 104 through the IS-95 layer 102 and MUX/DEMUX layer 103. The MUX/DEMUX layer 103 demultiplexes streams from data and control planes. The RLP layer 104 determines whether received radio frames include transmission errors and requests retransmission of defective radio frame up to an allowed number of times. Received radio frames are passed up to the PPP layer 106. The PPP layer 106 reassembles the data from the radio frames into packets. The PPP layer 106 also determines if the packets include transmission errors and forwards error free packets to the IP layer 108.

In accordance with one embodiment of the present invention, the RLP sender adds packet identification information into each radio frame. This allows the RLP receiver to use in-band information to identify a radio frame as belonging to a particular packet, to determine a position of the radio frame in the packet, to determine a received number of radio frames for the packet and to determine the packet of a radio frame having fatal transmission errors. In a particular embodiment, each radio frame includes a packet identifier and a frame identifier within the packet. The packet identifier may be a unique TCP and/or IP identifier or a specified packet identifier. The frame identifier may be a number of the frame for the packet. It will be understood that related radio frames from a common packet and/or the position of the frame in a packet may be otherwise suitably indicated by a transmitting device and/or determined by a receiving device without departing from the scope of the present invention. For example, a combination of identifiers and counters may be used by the receiving device. In addition, a control channel or other out-of-band signaling may also be used to communicate packet and frame identification information. Further, the transmitter may maintain a map of sequence frame numbers belonging to particular packets or otherwise track the relationship between frames and packets. In this embodiment, the receiver may provide a bitmap of received transmissions and/or dropped sequence numbers to the transmitter which uses the information to determine whether the remaining frames should be dropped or transmitted. The bit map of received frames may identify recently received frames, frames received within a defined period of time and/or frames corresponding to the packet of the dropped frame. Additionally and/or alternatively, the bit map may identify frames requiring retransmission.

Figure 3:
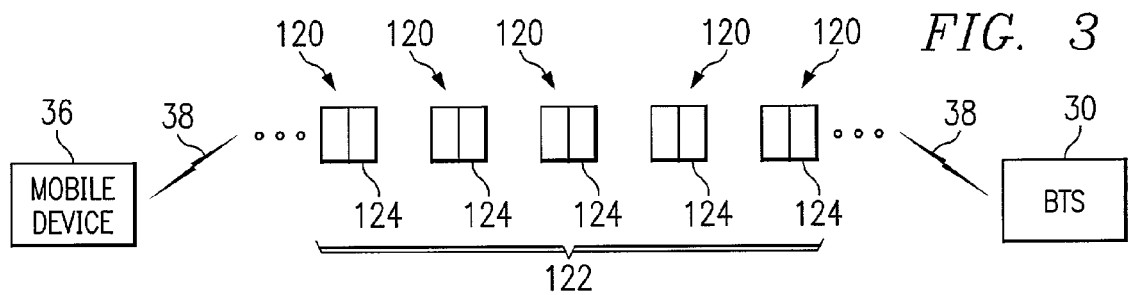
FIG. 3 is a block diagram illustrating transmission of radio frames for a packet over the wireless link of FIG. 1 in accordance with one embodiment of the present invention.

FIG. 3 illustrates transmission of radio frames between the BTS 30 and the mobile device 36 in accordance with one embodiment of the present invention. In this embodiment, the radio link 38 comprises a CDMA link, the radio frames comprise IS-95/CDMA 2000 frames and the BTS 30 and the mobile device 36 implement the protocol stack 100.

The BTS 30 and the mobile device 36 as well as other components to the communications system 10 comprise logic encoded in media for implementing the protocol stack 100 and other functionality of the devices. The logic comprises functional instructions for carrying out program tasks. The media comprises computer disks or other computer-readable media, application specific integrated circuits (ASIC), field programmable gate arrays (FPGA), digital signal processors (DSP), other suitable specific or general purpose processors, transmission media or other suitable media in which logic may be encoded and utilized.

Referring to FIG. 3, radio frames 120 are transmitted over the wireless link 38 between the BTS 30 and the mobile device 36. Each frame 120 includes an identifier 124 identifying the packet to which the radio frame 120 belongs and the number of the frame 120 within a set of frames 122 comprising data for the packet. As previously described, the identifier 124 may be generated by the RLP sender and extracted by the RLP receiver and thereby utilized for controlling frame transmissions and retransmissions. In particular, the receiving device may dynamically update a number of retransmissions on a per frame basis to more efficiently utilize wireless transmission resources. In addition or alternatively, the receiving device may signal the transmitting device to prevent transmission of radio frames for a packet to be discarded due to previous frame transmission errors.

Figure 4:
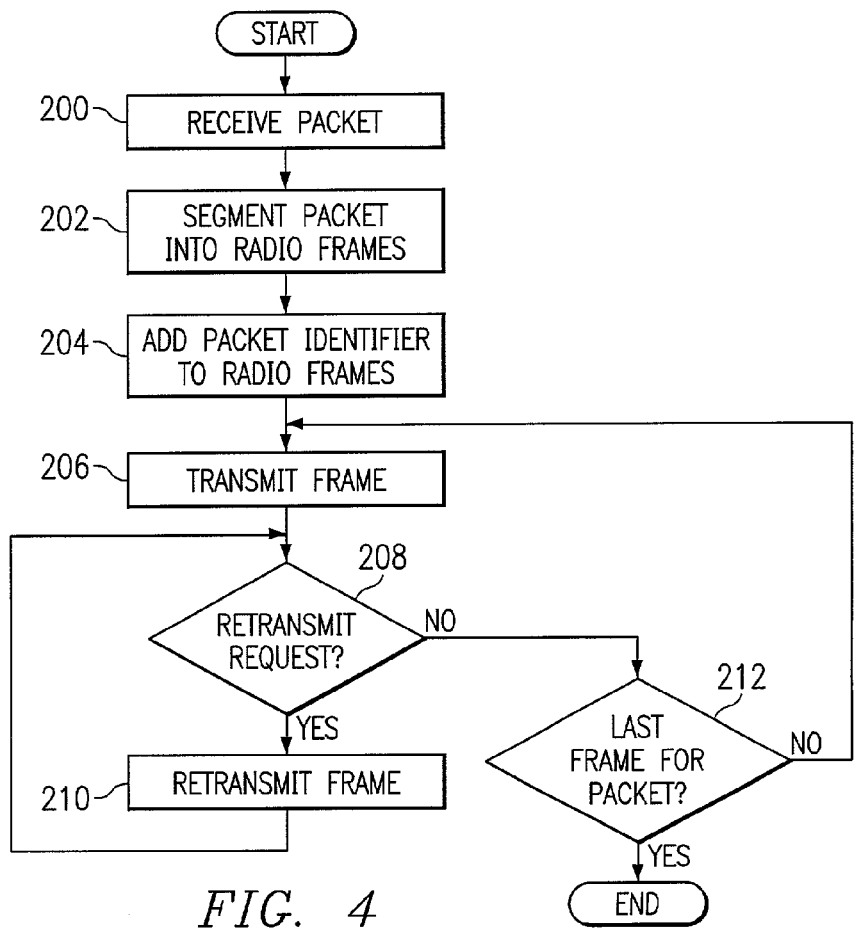
FIG. 4 is a flow diagram illustrating a method for transmitting radio frames of a packet over a wireless link in accordance with one embodiment of the present invention.

FIGS. 4 and 5 illustrate a method for dynamically controlling frame retransmissions over a wireless link in accordance with one embodiment of the present invention. In particular, FIG. 4 illustrates operation of the transmitting device for an information stream while FIG. 5 illustrates operation of the receiving device for the information stream. The BTSs 30 and the mobile devices 36 are each a receiving device and a transmitting device for a two-way communication connection.

Referring to FIG. 4, a method for transmitting radio frames for a packet over the wireless link 38 begins at step 200 in which a packet is received for transmission over the wireless link 38. Next, at step 202, the packet is segmented into a number of segments and encapsulated into radio frames 120 for transmission over the wireless link 38.

Proceeding to step 204, packet identification information 124 is added to the radio frames 120. The packet identification information 124 may be added to the radio frames 120 during or after generation of the frames 120 and may be an extension. The frames include sequence numbers or other suitable identification. At step 206, the radio frame 120 is transmitted over the wireless link 38.

At decisional step 208, the transmitting device determines whether the receiving device has requested retransmission of the frame 120 due to transmission errors. If the receiving device requests retransmission of the frame 120, the Yes branch of decisional step 208 leads to step 210. At step 210, the RLP layer 104 retransmits the frame 120. Step 210 returns to decisional step 208 in which the transmitting device again determines whether the receiving device has requested retransmission. Accordingly, the transmitting device will retransmit a frame 120 when and as often as requested to do so by the receiving device.

If the receiving device does not request retransmission of the frame 120, the No branch of decisional step 208 leads to decisional step 212. At decisional step 212, if additional frames 120 remain to be transmitted for the packet, the No branch returns to step 206 in which the next frame 120 is transmitted over the wireless link 38. After all the frames 120 of the packet have been transmitted over the wireless link 38 and retransmitted as requested, the Yes branch of decisional step 212 leads to the end of the process. It will be understood that the transmitting device may continuously transmit frames 120, without waiting for retransmit instructions and retransmit frames 120 as such instructions are received. Accordingly, frames 120 for a same or different packet may be transmitted between an initial transmission and a retransmission of a frame.

Referring to FIG. 5, a method for receiving radio frames 120 and dynamically controlling radio frame 120 retransmissions over the wireless link 38 begins at step 250 in which a radio frame 120 including a packet identifier 124 and sequence number is received by the receiving device. Next, at step 252, the receiving device determines whether a transmission error has occurred. In one embodiment, a transmission error has occurred if a frame between the received frame and a previously received frame has not been received, which is determined based on sequence numbers of the received frames. A transmission error has also occurred if a retransmit timer for a previous retransmit request has expired without receipt of the requested frame. If a transmission error has occurred, the Yes branch of decisional step 252 leads to step 254.

At step 254, the RLP layer 104 determines the number of successful frames received for the packet. The packet of a non-received frame may be identified by the packet for the previous or subsequent frames received depending on beginning or end of packet indicators, frame counts and other suitable indicators. A non-received frame is a frame for which none, only some and/or defective information has been received and thus requires retransmission. The number of successfully received frames may be determined by counting buffered frames for the packet to which the non-received frame 120 belongs or by maintaining a count of each frame 120 successfully received for the packet. Next, at step 256, the RLP layer 104 determines a number of allowed retransmissions for the non-received frame 120 based on the number of successfully received frames for the packet.

It will be understood that the number of allowed retransmissions may be dynamically determined on a per frame basis based on other suitable positions of the defective frame 120 in a set of related frames for the packet to which the frame 120 corresponds. Thus, the number of allowed retransmissions may be based on the absolute position, or sequence number, of the frame 120 in a set of all frames for the packet as well as the number of successfully received frames.

To optimize utilization of transmission resources and/or minimize inefficient retransmission of entire packets, the number of allowed retransmissions for a frame 120 may increase as the number of successfully received frames for the packet increases. Thus, for example, while the allowed number of retransmissions for a first subset of frames of a packet may be three, the allowed number of retransmissions may increase to four for the next subset of frames and increase to five for the last subset of frames for the packet. For a 520 byte upper layer packet fragmented into 17 radio frames each carrying a 32 byte payload, the first five successfully received frames may have three allowed retransmissions while the next five may frames may have four allowed retransmissions and the remaining seven frames have five allowed retransmissions. Thus, inefficient retransmission of the whole upper layer packet is alleviated when a significant portion of the packet has already been successfully transmitted and/or received. In this way, upper layer protocol recovery is reduced for the wireless link 38 by increasing retransmissions at the lower layer to allow recovery using smaller segments of bandwidth than required for upper layer recovery. It will be understood that retransmissions may otherwise be incremented for subsets of frames to efficiently use transmission resources. For example, the decision on a number of retransmissions may also be based on link quality or a combination of link quality and a number of frames received. Thus, the number of retransmissions may be a first variable number based on the number of successfully received frames plus and/or minus a second variable number determined as a function of link quality.

Proceeding to decisional step 258, the RLP layer 104 determines whether to request retransmission of the non-received frame 120. If the number of previous retransmissions is less than the allowed number of retransmissions, the Yes branch of decisional step 258 leads to step 260 at which the RLP layer 104 requests retransmission of the frame 120 from the transmitting device. At this step, a retransmit counter for the non-received frame may be initialized and/or decremented to track the number of retransmissions and the retransmit timer reset. A retransmit request for a frame is unsuccessful if the frame is not received prior to expiration of the timer. Step 260 returns to step 250 in which a next frame 120 is received and processed. If the non-received frame 120 has been retransmitted the allowed number of times at decisional step 258, no further retransmission of the frame is requested despite unsuccessful reception of the frame. In this case, the No branch of decisional step 258 leads to decisional step 262 for determination and processing of any remaining frames.

Returning to decisional step 252, when frames are successfully received by initial transmission or by retransmission without transmission errors, the No branch of decisional step 252 also leads to step 262. At step 262, if the frame 120 is not the last frame 120 for the packet, the No branch returns to step 250 in which the next frame is received and processed. If the frame 120 is the last frame 120 for the packet, the Yes branch of decisional step 262 leads into the end of the process in which all the frames have been received without transmission errors or have been retransmitted an allowed number of times. The received frames 120 are passed to the PPP/IP/TCP/IP layers 106, 108 and 110 for reassembly of the packets and higher level control. It will be understood that the receiving device may continuously receive frames 120 without waiting for a non-received frame 120 of a packet to be retransmitted. Accordingly, frames 120 for a same or different packet may be received between an initial and a retransmission of a frame 120. It will be further understood that the request for frame retransmissions may be made upon expiry of the retransmission counter.

Figure 7:
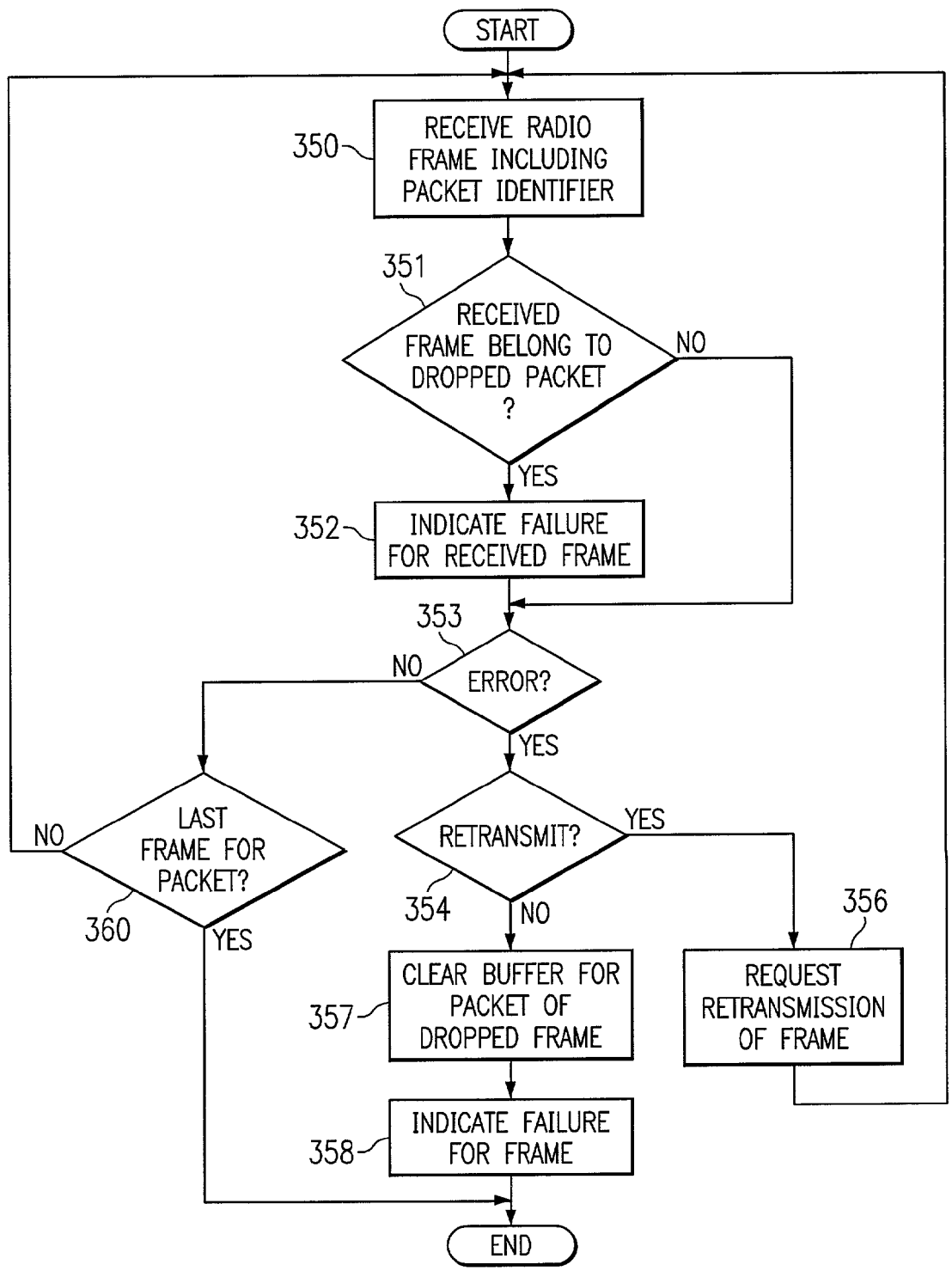
FIG. 7 is a flow diagram illustrating a method for stopping transmission over a wireless link of frames for a packet to be discarded due to previous transmission errors in accordance with one embodiment of the present invention.

FIGS. 6 and 7 illustrate a method for stopping transmission over a wireless link of frames for a packet to be discarded due to previous transmission errors in accordance with one embodiment of the present invention. In particular, FIG. 6 illustrates operation of the transmitting device while FIG. 7 illustrates operation of the receiving device. As previously described, the BTSs 30 and the mobile devices 36 may each be a receiving device and a transmitting device for a two-way communication connection.

Referring to FIG. 6, a method for transmitting radio frames 120 for a packet over the wireless link 38 begins at step 300 in which a packet is received for transmission over the wireless link 38. Next, at step 302, the packet is segmented into a number of segments and encapsulated into radio frames 120 for transmission over the wireless link 38.

Proceeding to step 304, packet identification information is added to the radio frames 120. As previously described, the packet identification information may be added to the radio frames 120 during or after generation of the frames 120 and may be an extension. The frames 120 include sequence numbers or other suitable identifiers. Next, at step 306, the radio frame 120 is transmitted over the wireless link 38.

At decisional step 308, the transmitting device determines whether the receiving device has requested retransmission of the frame 120 due to transmission errors. If the receiving device requests retransmission of the frame 120, the Yes branch of decisional step 308 leads to step 310. At step 310, the RLP layer 104 retransmits the frame 120. Step 310 returns to decisional step 308 in which the transmitting device again determines whether the receiving device has requested retransmission. Accordingly, the transmitting device will retransmit a frame 120 when and as often as requested to do so by the receiving device.

If the receiving device does not request retransmission, No branch of decisional step 308 leads to decisional step 312. At decisional step 312, the transmitting device determines whether a transmission failure has occurred for the frame 120 and/or whether the frame 120 has been successfully transmitted by an initial transmission or one or more requested retransmissions. In one embodiment, the transmitting device may be informed of a transmission failure by the receiving device through a suitable in-band or out-of-band signal identifying the frame and/or packet or by the absence of a successfully received frame signal. If transmission failure for the frame 120 has occurred that is not recoverable at the lower frame layer by retransmissions, the Yes branch of decisional step 312 leads to step 314. At step 314, the packet to which the frame belongs is identified and remaining frames 120 for the packet are dropped because the frames will later need to be retransmitted as part of upper packet layer recovery. The set of remaining frames may be frames for the packet that have not yet been transmitted from the transmitting device or successfully received by the receiving device. The set of remaining frames may include or exclude frames at the transmitting device that are currently being transmitted or are queued for imminent transmission. Thus, the set of remaining frames may comprise any suitable portion of frames at the transmitting device. Step 314 leads to the end of the process in which frames 120 that will later need to be retransmitted due to previous transmission errors are dropped by the transmitting device to reduce unnecessary transmission and thus interference on the network.

Returning to decisional step 312, if the frame 120 was successfully received by the receiving device, the No branch of decisional step 312 leads to decisional step 316. At decisional step 316, if additional frames remain to be transmitted for the packet, the No branch returns to step 306 in which the next frame 120 is transmitted over the wireless link 38. After all the frames 120 of the packet have been transmitted over the wireless link 38 and retransmitted as requested and successfully received, the Yes branch of decisional step 316 leads to the end of the process. It will be understood that the transmitting device may continuously transmit frames 120 without waiting for retransmit instructions and retransmit frames 120 as such instructions are received. The transmitting device may also drop remaining frames 120 for a packet having a previous frame transmission error as such a signal is received. Accordingly, frames 120 for a same or different packet may be transmitted between an initial and a retransmission of a frame 120 and one or more frames 120 for a packet having fatal transmission errors may be transmitted before the transmitting device receives a signal indicating the fatal transmission errors for frames of the packet.

Referring to FIG. 7, a method for receiving frames and stopping transmission of frames 120 for a packet to be discarded due to previous transmission errors begins at step 350 in which a radio frame 120 including a packet identifier and a sequence number is received by the receiving device. Next, at decisional step 351, the receiving device determines whether the received frame belongs to a dropped packet based on the included packet identifier. If the received frame belongs to a dropped packet, the Yes branch of decisional step 351 leads to step 352 in which a failure for the received frame is indicated to the transmitting device in order to allow the transmitting device to discard or otherwise drop the remaining frames 120 for the packet and thereby avoid unnecessary transmissions. Thus, if a frame is dropped, or lost, at the receiving device but the failure indicator was not successfully communicated to the transmitting device, the indicator will be retransmitted for each received frame of the dropped packet.

Step 352 as well as the No branch of decisional step 351 lead to step 353 where the receiving device determines whether a transmission error has occurred. In one embodiment, a transmission error has occurred if a frame between the received frame and a previously received frame has not been received, which is determined based on sequence numbers of the received frames. A transmission error has also occurred if a retransmit timer for a previous retransmit request has expired and the frame for the previously identified missing sequence number has not yet been received. If a transmission error occurred, the Yes branch of decisional step 353 leads to decisional step 354.

At decisional step 354, the receiving device determines whether to request retransmission of a non-received frame 120. In one embodiment, the receiving device may request retransmission of each frame up to a set and constant number of times. In another embodiment, as previously described in connection with FIG. 5, the receiving device may dynamically determine the allowed number of frame retransmissions based on the position of the frame 120 in a set of related frames for the packet. To track the number of retransmissions, a retransmission counter may be instantiated for each non-received frame and decremented for each retransmission request. In this embodiment, when the counter equals zero or other specified value, the frame has been retransmitted the allowed number of times and no further request for retransmission will be made.

If the non-received frame 120 has not yet been retransmitted the allowed number of times, the Yes branch of decisional step 354 leads to step 356. At step 356, the RLP layer 104 requests retransmission of the frame 120 from the transmitting device. At this step, a retransmit counter for the frame may be decremented to track the number of retransmissions and the retransmit timer reset. Step 356 returns to step 350 in which a next frame 120 is received and processed.

Once a frame 120 has been transmitted the allowed number of times, no further transmission of the frame 120 is requested and the No branch of decisional step 354 leads to step 357 in which the buffer containing received frames for the packet of the dropped frame is cleared. Next, at step 358, the receiving device indicates to the transmitting device a transmission failure for, or loss of, the non-received frame 120. As previously described, this allows the transmitting device to discard or otherwise drop the remaining frames 120 for the packet and thereby avoid unnecessary transmissions. In one embodiment, the receiving device indicates the frame transmission failure by generating a control signal identifying the packet to which the frame 120 belonged. In another embodiment, the receiving device may combine all retransmit requests for frames and failure signals generated over a period of time into a bit map signal indicating the frames needing retransmission and the dropped frames and/or packets of dropped frames. In this embodiment, the bit map signal with all outstanding requests and signals is communicated to the transmitting device.

In response to the frame failure indicator, the transmitting device drops all remaining frames 120 for the identified packet. Step 358 leads to the end of the process by which transmission of lower layer data that will be need to be again transmitted due to already existing errors in an upper layer dataset is eliminated.

Returning to decisional step 353, if no transmission error occurred, the No branch of decisional step 353 leads to decisional step 360. At decisional step 360, if the frame 120 is not the last frame 120 for the packet, the No branch returns to step 350 in which the next frame 120 is received. If the frame is the last frame 120 for the packet, the Yes branch of decisional step 360 leads to the end of the process. The received frames are passed to PPP/IP/TCP layers 106, 108 and 110 for reassembly of the packets and higher level control. If the packet is missing data due to undetected errors in the received frames 120, PPP layer 106 will not forward the packet. The TCP layer 110 will time out and request retransmission of the entire packet.

Although the present invention has been described with several embodiments, various changes and modifications may be suggested to one skilled in the art. It is intended that the present invention encompass such changes and modifications as fall within the scope of the appended claims and their equivalents.

What is claimed is:

1. A method for efficient utilization of transmission resources in a wireless network, comprising:
   in response to at least unsuccessfully receiving a radio frame for a packet from a wireless link, requesting retransmission of the frame up to an allowed number of retransmissions;
   determining a position of the frame in a set of related frames for the packet, wherein a sequence number corresponds to the position of the frame;
   determining the allowed number of retransmissions for the frame based on the position of the frame in the set of related frames, wherein the allowed number of retransmissions for the frame increases as the sequence number corresponding to the position of the frame in the set of related frames increases; and
   in response to at least unsuccessfully receiving the frame from the allowed number of retransmissions, generating a signal for transmission to a device transmitting the frame, the signal operable to prevent the device from transmitting a set of remaining frames for the packet.

2. The method of claim 1, wherein the signal comprises a bitmap identifying the frame and identifying a disparate frame for retransmission.

3. The method of claim 1, wherein the radio frame identifies the packet and the signal for transmission to the device transmitting the frame identifies the packet.

4. The method of claim 1, wherein the set of related frames comprises all frames for the packet.

5. The method of claim 1, wherein the set of related frames comprises a set of successfully received frames for the packet.

6. The method of claim 1, wherein the signal for transmission to the device transmitting the frame is operable to prevent the device from transmitting the set of remaining frames by causing the device to drop the set of remaining frames.

7. A system for efficient utilization of transmission resources in a wireless network, comprising:
   means, in response to at least unsuccessfully receiving a radio frame for a packet from a wireless link, for requesting retransmission of the frame up to an allowed number of retransmissions;
   means for determining a position of the frame in a set of related frames for the packet, wherein a sequence number corresponds to the position of the frame;
   means for determining the allowed number of retransmissions for the frame based on the position of the frame in the set of related frames, wherein the allowed number of retransmissions for the frame increases as the sequence number corresponding to the position of the frame in the set of related frames increases; and
   means, in response to at least unsuccessfully receiving the frame from the allowed number of retransmissions, for generating a signal for transmission to a device transmitting the frame, the signal operable to prevent the device from transmitting a set of remaining frames for the packet.

8. The system of claim 7, wherein the signal comprises a bitmap identifying the frame and identifying a disparate frame for retransmission.

9. The system of claim 4, wherein the radio frame identifies the packet and the signal for transmission to the device transmitting the frame identifies the packet.

10. The system of claim 7, wherein the set of related frames comprises all frames for the packet.

11. The system of claim 7, wherein the set of related frames comprises a set of successfully received frames for the packet.

12. The system of claim 7, wherein the signal for transmission to the device transmitting the frame is operable to prevent the device from transmitting the set of remaining frames by causing the device to drop the set of remaining frames.

13. A system for efficient utilization of transmission resources in a wireless network, comprising:
   logic encoded in media; and
   the logic operable to request retransmission of an unsuccessfully received radio frame up to an allowed number of retransmissions, to determine a position of the frame in a set of related frames for the packet, wherein a sequence number corresponds to the position of the frame, to determine the allowed number of retransmissions for the frame based on the position of the frame in the set of related frames, wherein the allowed number of retransmissions for the frame increases as the sequence number corresponding to the position of the frame in the set of related frames increases, and, in response to at least unsuccessfully receiving the frame from the allowed number of retransmissions, to generate a signal for transmission to a device transmitting the frame, the signal operable to prevent the device from transmitting a set of remaining frames for a packet to which the frame belongs.

14. The system of claim 13, wherein the signal comprises a bitmap identifying the frame and identifying a disparate frame for retransmission.

15. The system of claim 13, wherein the radio frame identifies the packet and the signal for transmission to the device transmitting the frame identifies the packet.

16. The system of claim 13, wherein the set of related frames comprises all frames for the packet.

17. The system of claim 13, wherein the set of related frames comprises a set of successfully received frames for the packet.

18. The system of claim 13, wherein the signal for transmission to the device transmitting the frame is operable to prevent the device from transmitting the set of remaining frames by causing the device to drop the set of remaining frames.

19. A method for efficient utilization of transmission resources in a code division multiple access (CDMA) network, comprising:
- in response to at least unsuccessfully receiving a radio frame for a packet from a wireless link of a CDMA network, determining a position of the radio frame in a set of related frames for the packet;
- determining an allowed number of retransmissions for the frame based on the position of the frame in the set of related frames, wherein the allowed number of retransmissions for the frame increases as the sequence number corresponding to the position of the frame in the set of related frames increases;
- requesting retransmission of the radio frame up to the allowed number of retransmissions; and
- in response to at least unsuccessfully receiving the frame from the allowed number of retransmissions, generating a signal for transmission to a device transmitting the frame operable to prevent the device from transmitting a set of remaining frames for the packet.

* * * * *